(No Model.)
J. F. & R. F. A. HELMOLD.
SPROCKET AND CHAIN GEARING.
No. 462,255. Patented Nov. 3, 1891.
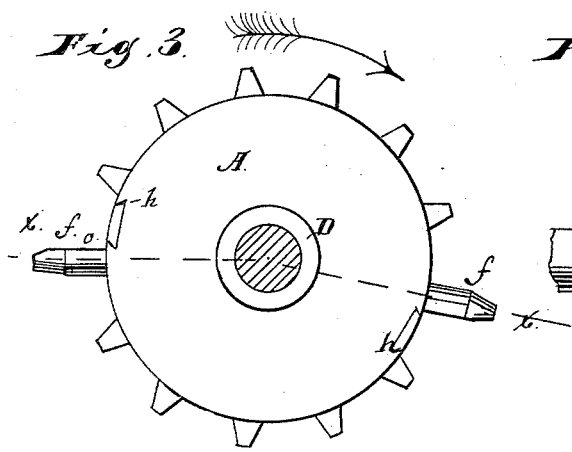
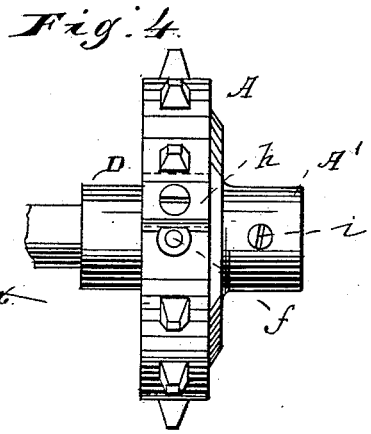
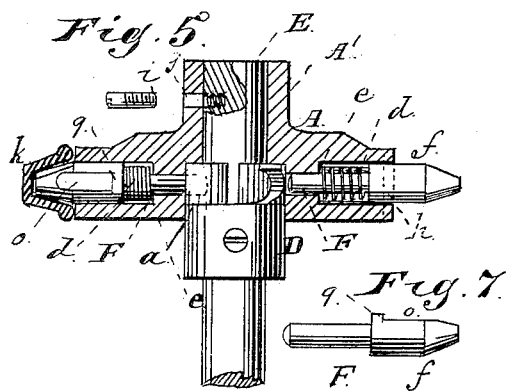
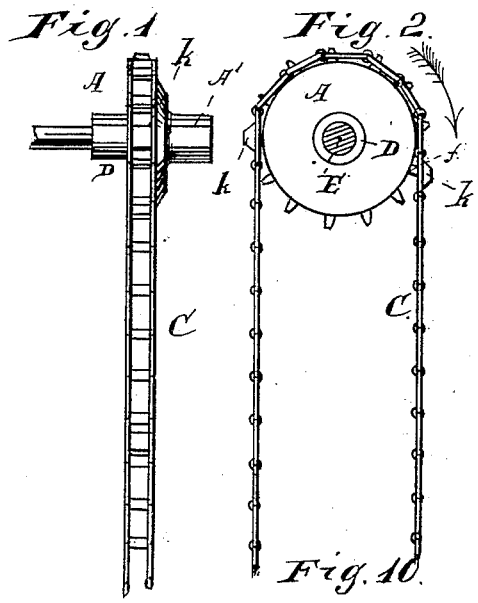
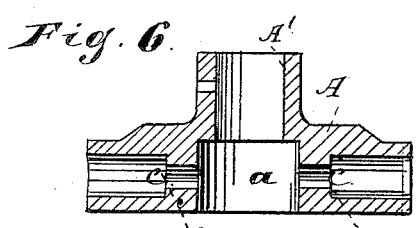
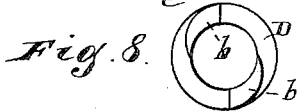
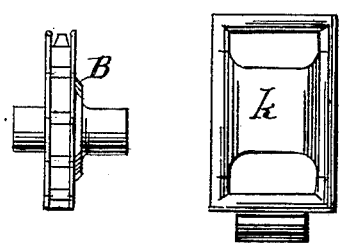
Witnesses
H. F. Wallmann
O. V. Sirtley
Inventors
Julius F. Helmold
Richard F. A. Helmold
By their Attorney
Heinrich F. Bruns
THE NORRIS PETERS CO., PHOTO-LITHO., WASHINGTON, D. C.

UNITED STATES PATENT OFFICE.

JULIUS F. HELMOLD AND RICHARD F. A. HELMOLD, OF CHICAGO, ILLINOIS.

SPROCKET AND CHAIN GEARING.

SPECIFICATION forming part of Letters Patent No. 462,255, dated November 3, 1891.

Application filed July 24, 1888. Serial No. 280,927. (No model.)

*To all whom it may concern:*

Be it known that we, JULIUS F. HELMOLD and RICHARD F. A. HELMOLD, citizens of the United States, residing at Chicago, in the county of Cook and State of Illinois, have invented a new Sprocket and Chain Gearing, of which the following is a specification, reference being had to the accompanying drawings and letters marked thereon.

Our invention relates to mechanical movements, the object being to produce intermittent motion by means of sprocket-wheels connected by an endless chain. To this end the wheel to which continuous motion is imparted and which at the same time is required to communicate intermittent motion turns loosely on the shaft it is arranged upon, except when it is coupled to the same, so as to cause the shaft to rotate simultaneously. We effect this coupling by means of the chain, the same being provided at suitable distances with caps adapted to press or force down a bolt or bolts extending from the box out of the periphery of said wheel, so as to serve as sprockets when the wheel is loosely to rotate on its shaft and as coupling-pins when the shaft is required to rotate with said wheel. Thus an intermittent motion may be produced whatever the distance apart of the wheels so connected by a chain may be and whatever relative position to each other they may occupy. When an intermittent motion is not required, a continuous motion may readily take its place by adjusting or putting the coupling-pins of said wheel in a proper position to the stops the shaft is provided with, so as to effect a coupling of the same, and fastening the wheel directly to the shaft.

In the drawings, which form a part of this specification, Figure 1 is a side view of two sprocket-wheels connected by an endless chain and embodying our invention. Fig. 2 is a front view of a portion of the same. Fig. 3 is a face view of the wheel on a larger scale, containing the mechanisms to be worked upon by the caps of the chain. Fig. 4 is a side view of the same. Fig. 5 is a section at the line $x\, x$ in Fig. 3, with a cap of the chain in section pressing down one of the bolts. Fig. 6 is a section of the wheel on the line $x\, x$ in Fig. 3, with parts removed. Fig. 7 is a detail showing a ball separate. Figs. 8 and 9 are details showing a clutch to be fastened upon the shaft and fitting into the widened part of the box of said wheel, forming stops for the bolt or bolts to strike against when forced down by the chain. Fig. 10 shows a plan view of a link of the chain enlarged and provided with a cap.

A is a sprocket-wheel connected with another wheel B by means of an endless chain C and having its box widened, so as to form a cylindrical cavity for receiving a clutch D, set upon the shaft E, to be fastened by a screw or otherwise, though clutch D and shaft E may be made in one piece when desired.

The clutch D, extending into the cavity $a$ of the wheel A, is so shaped as to furnish a stop or stops $b\, b$, engaging with a bolt or bolts F F when forced down. These bolts F F are guided in suitable holes $c\, c$, extending from said cavity $a$ to the periphery of the wheel A, and held in their proper position when not pushed down by outside force by spiral springs $d\, d$, the same resting with one end against shoulders $e\, e$ in their holes $c\, c$, while their other ends press against bearings formed by the enlarged ends or heads $f\, f$ inside of the wheel, said ends projecting out of the periphery and forming sprockets. To prevent said bolts from slipping out of the holes $c\, c$ or turning inside of the same, the enlarged ends or heads $f\, f$ are flattened at one side, as will be seen in Figs. 5 and 7, at $e$, so as to leave a projection $g$, which will be overlapped by a dovetailed plate $h$, fastened by a screw upon the periphery of the wheel A; but instead of making said heads $f\, f$ of the bolts F F cylindrical they may be rectangular or of any other suitable shape, so as to be prevented from turning, and any other suitable means may be employed to keep them inside of the holes $c\, c$ when pressed upon by the spiral springs $d$. The ends or heads $f\, f$ of the bolts F F, serving also as sprockets, are preferably made conical at their extremities and a little longer than the other sprockets of the wheel.

$i$ is a screw, and $j$ a hole in the hub A′ of the wheel A, said screw to be screwed into the shaft E when the shaft E is required to rotate continuously, which will be easily accomplished when the wheel and shaft are brought into a coupling position.

The chain C to be employed may be any open-link chain or any other chain adapted to be provided with caps $k$ to be substituted in place of links or any other mechanisms adapted to perform said function, as described, as we do not limit ourselves to the special construction of the sprocket-wheels and chain shown in the drawings.

The sprocket-wheels may be provided with forked sprockets, and a chain adapting itself to such wheels may be provided with suitable means to accomplish the result sought by our invention.

Our invention is especially adapted to be applied to machines in which intermittent motion from one shaft to another is to be imparted when said shafts are too far apart to make it practical to use gearing otherwise suitable for imparting intermittent motion. This is the case, for instance, with type-casting machines, in which intermittent motion is required, as the mold having received the charge of metal is required to be closed for a while, allowing the cast type to be cooled before falling out.

The operation of our invention will be readily understood by Fig. 2 of the drawings, in which F A is the wheel, running loosely on its shaft at intervals when the bolts F are forced out by the springs J; but as soon as one of these bolts F is forced down by a cap $k$ the wheel A is coupled to its shaft and rotates with the same. Thus intermittent motion will be imparted from the wheel B, firmly secured to its shaft and continuously rotating with the same, whatever the distance may be between its shaft and the shaft to be rotated at intervals. The wheel A, having upon it the chain C, as is shown in Fig. 2, will always make half a revolution with the shaft whenever one of the bolts comes in contact with a cap $k$, as the cap, forcing down the bolt, will couple the wheel to its shaft; but as soon as the cap releases said bolt the wheel will run loosely on its shaft, said shaft being at rest. Thus by placing the caps $k$ at suitable distances intermittent motion may be imparted at regular intervals, and it requires no explanation that any other intermittent motion may be acquired when bolts F and caps $k$ are put in a proper relative position to each other, so that more or less than half-revolutions, or, rather, any fractions of a total revolution, may be obtained.

What we claim, and desire to secure by Letters Patent, is—

1. A sprocket and chain gearing for producing intermittent motion, consisting of a sprocket-wheel, the same being loose on its shaft and provided with a bolt or bolts projecting from the circumference of said sprocket-wheel and adapted to secure the wheel to its shaft, and a chain provided with a cap or caps for forcing down said bolts, thereby coupling said sprocket-wheel to its shaft, all combined as set forth.

2. A sprocket and chain gearing for producing intermittent motion, consisting of a sprocket-wheel A, provided with spring-seated bolt or bolts F, a chain connecting said wheel A with a wheel imparting motion, and said chain provided with a cap or caps $k$ for pressing down the bolts F, and thereby coupling the wheel A to its shaft, all combined as set forth.

JULIUS F. HELMOLD.
RICHARD F. A. HELMOLD.

Witnesses:
JOHN L. PEARSON,
HEINRICH F. BRUNS.